US000001123H

United States Statutory Invention Registration [19]

[11] Reg. Number: H1123

[43] Published: Dec. 1, 1992

Eickerman et al.

[54] OFF-ROUTE NON-CONTACT SYSTEM FOR DETECTING VEHICLES

[75] Inventors: Curtis L. Eickerman, Tempe; Robert W. Withers, Overgaard, both of Ariz.

[73] Assignee: The United States of America as represented by the Secretary of the Army, Washington, D.C.

[21] Appl. No.: 797,591

[22] Filed: Nov. 25, 1991

[51] Int. Cl.[5] ..... G01S 13/86; G01S 13/44; H04B 1/06

[52] U.S. Cl. ..... 367/128; 367/136; 342/52; 342/56; 342/140; 342/149

*Primary Examiner*—Bernarr E. Gregory

*Attorney, Agent, or Firm*—Anthony T. Lane; Edward Goldberg; Michael Sachs

[57] ABSTRACT

A system for detecting the approach of a vehicle toward the line of sight of an antenna comprises an alerter for receiving an acoustic noise signal from the vehicle and determining whether the signal is increasing or decreasing. The increase of a noise signal indicates the approach of a vehicle and is used to activate a power supply to supply power to a digital signal processor. The digital signal processor receives the acoustic signal and performs a comparison to determine whether the signal in fact is noise produced by a vehicle. If so, the digital signal processor activates a radar based primary sensor which more accurately detects the approach of the vehicle and determines the instant at which the vehicle passes an antanna of the sensor. When the vehicle passes the antenna, the digital processor receives data and produces an output signal that can be used to activate a counter to count the passage of vehicles, surveillance equipment or to fuse a mine if the vehicle is assumed to be hostile. Any time during detection of the acoustical signal, if the alerter determines that the signal's amplitude is falling off, this indicates the vehicle is moving away and this is utilized to disconnect power to the digital processor and to the sensor. This conserves power and is particularly important for off route areas where power is supplied by battery.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OFF-ROUTE NON-CONTACT SYSTEM FOR DETECTING VEHICLES

GOVERNMENTAL INTEREST

The U.S. Government has rights in this invention under Contract No. DAAK10-79-C-0051 awarded by the Department of the Army. The invention described herein may be manufactured, used and licensed by or for the Government for Governmental purposes without payment to me/us of any royalties.

RELATED CASE

This application is related to application Ser. No. 07/582,732, filed Sep. 13, 1990 by Curtis Eickerman and Robert W. Withers, entitled "Off-route Non-Contact System for Detecting Vehicles".

FIELD AND BACKGROUND OF THE INVENTION

The present invention relates in general to equipment for detecting the presence of vehicles, and in particular to a new and useful non-contact system which is capable of sophisticated sensing and signal processing capacity while utilizing minimal energy.

The need often arises in remote areas to detect the presence of vehicles. Accurate detection of vehicles is utilized for various functions such as to activate the fusing of mines in hostile areas, vehicle counting, surveillance and intrusion detection.

In remote areas where power is limited, it becomes increasingly difficult to provide sufficiently sophisticated equipment which is capable of distinguishing between potentially hostile vehicles and other moving objects or noise producing objects such as wild life, air craft flying over an area, natural occurrences such as thunder and other distractions.

SUMMARY OF THE INVENTION

An object of the present invention is to provide an off-route non-contact system which is capable of detecting vehicles which traverse a specific area, and further which is capable of distinguishing between vehicles and other moving objects or noise producing phenomenon.

According to the present invention, the system comprises an acoustic alerter which detects and amplifies acoustic signals that are utilized to channel power to a digital signal processor, that is connected to the alerter. The signal processor once activated by the occurrence of an acoustic signal, processes signals received by the alerter to determine whether the signals correspond to the sound patterns of a vehicle. Some patterns can be stored in the digital signal processor for positive identification of the vehicle simply on the basis of the acoustic signal. During signal processing, if the alerter determines that the noise is decreasing (signifying the vehicle is moving away from the site) signal processing is interrupted and the power supply to the processor interrupted to conserve energy.

If signal processing determines the potential presence of a vehicle, the processor activates power to a primary sensor which for example is in the form of a monopulse radar unit that provides for a more sophisticated and positive identification of the vehicle. If the vehicle passes the antenna of the primary sensor, this information is conveyed to the digital signal processor which generates an output signal indicative of the presence of the vehicle at the line of sight of the antenna.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
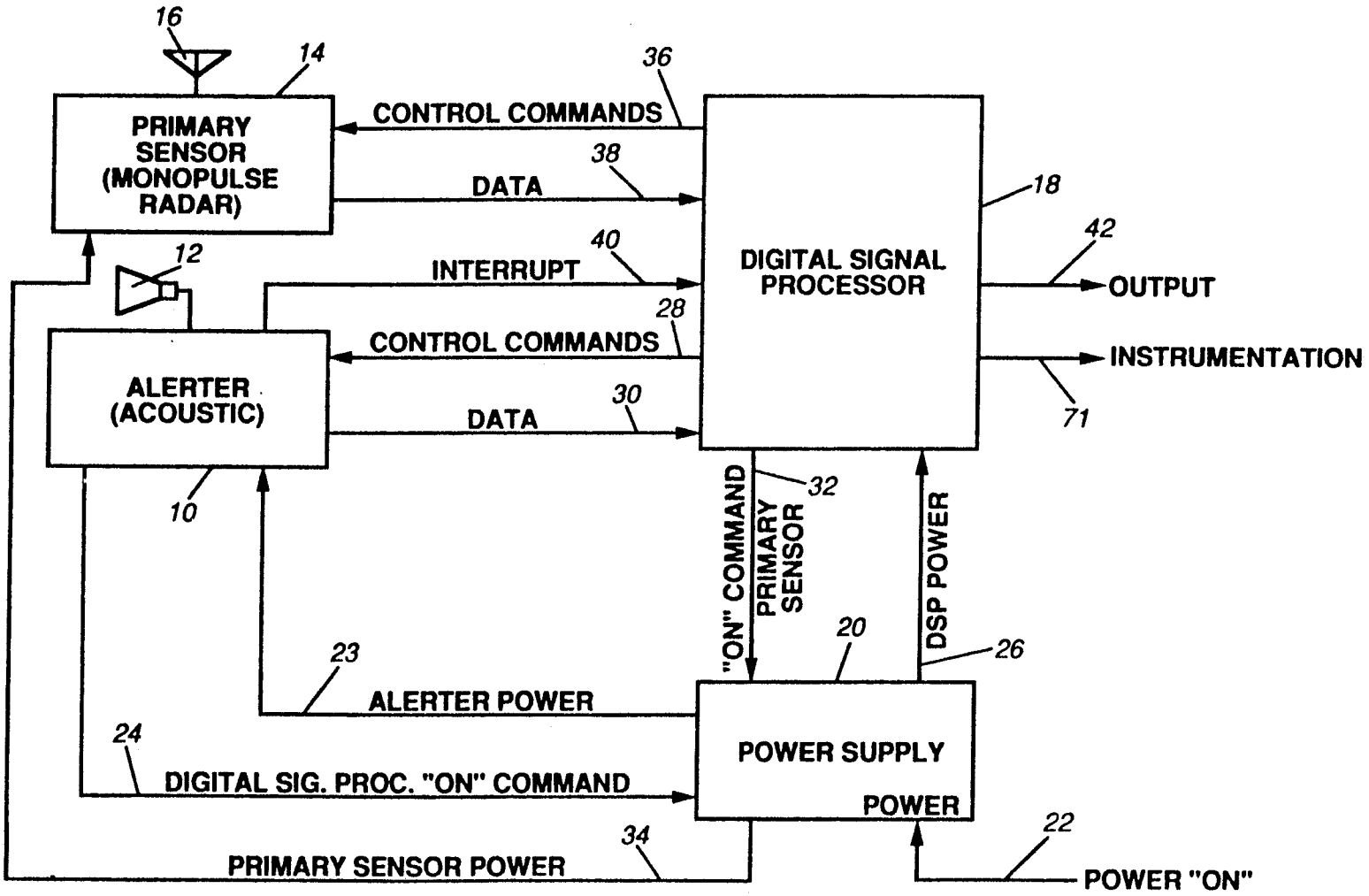
FIG. 1 is a block diagram showing the overall system of the present invention.

The system of the present invention is shown in FIG. 1 and comprises: an acoustic alerter 10; a digital signal processing 18; a primary sensor monopulse radar 14; and a power supply 20.

The acoustic alerter 10 uses a microphone 12 which detects noises above a minimum sound pressure level (SPL) which are also increasing in amplitude. In response to this, the alerter activates the digital signal processor 18 (DSP) via a digital signal "proc. 'ON' command" over line 24 to the power supply 20. This causes power to be applied over line 26 to the microprocessor based digital signal processor 18. In response to being turned on, the DSP requests from the alerter (via control commands on line 28) acoustic spectral data (via the data line 30). The DSP uses this spectral data to determine whether the cause of the "alert" is a vehicle (specific types of vehicle may also be identified).

If the DSP identifies the acoustic noise as being from a vehicle, it activates the monopulse radar primary sensor 14. This activation is via a "primary sensor 'ON' command" on line 32 to the power supply. Power is than applied over line 34 to the primary sensor 14, which is also controlled by the DSP via control commands on line 36. The DSP then provides the necessary control signals to the primary sensor to obtain radar data over line 38. This data, consisting of vehicle range and azimuth information, allows the DSP to determine when the vehicle crosses the line-of-sight of the primary sensor's antenna 16. When a vehicle is detected crossing this line-of-sight within a predetermined range, the DSP initiates an output signal at 42 which can be used to trigger other mechanisms that do not form a part of this disclosure.

Figure 2:
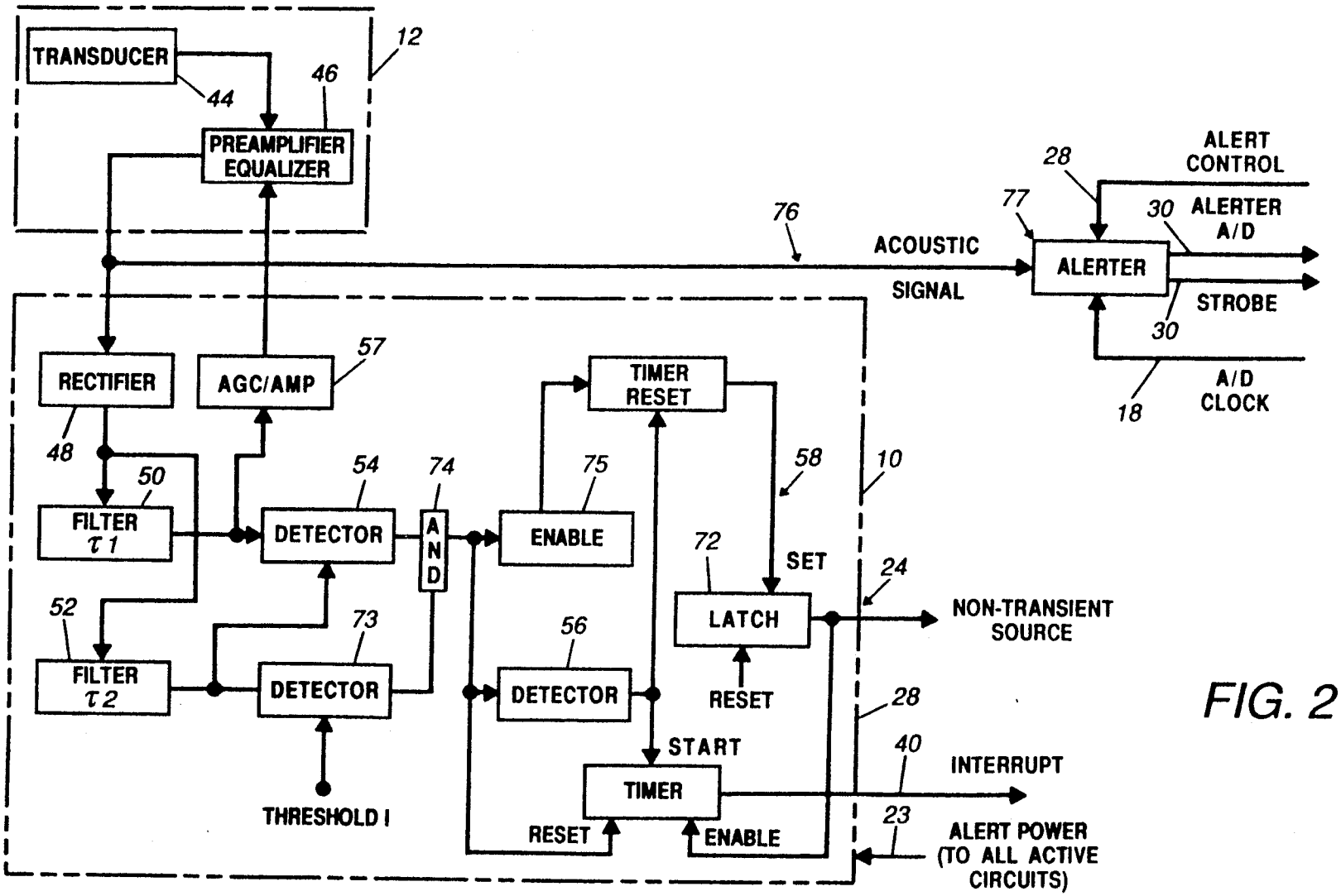
FIG. 2 is a block diagram showing details of the acoustic alerter according to the present invention.

In the event the vehicle causing the "alert" does not cross the line-of-sight of antenna 16, the alerter 10 detects the decreasing sound pressure level at 56 in FIG. 2, and responds by sending a signal (via the interrupt line 40) to the DSP 18. This interrupt signal causes the DSP to suspend signal processing and disconnects primary sensor power (if it had been turned on). Then the DSP acknowledges (via control commands) 28 to non-transient latch 72 of FIG. 2 that it has stopped signal processing, whereupon the alerter disconnects DSP power (via the digital signal processor 'ON' command 24). This minimizes power consumption for battery powered applications and prepares the system for the next approaching vehicle.

FIG. 2 illustrates details of the alerter 10. A preamplifier and equalizer 46 connected to a transducer 44 form the microphone 12 which is connected by a rectifier 48 to a first low pass filter 50 and a second low pass filter 52. First low pass filter 50 and second low pass filter 52 are connected to a noise increase detector 54 (a comparator) which compares the signals from the two low pass filters to determine whether an acoustic signal is increasing. The second low pass filter 52 is connected to noise threshold detector 73 (a comparator) which compares the signal level from 52 with a fixed threshold identified as Threshold 1. The outputs of 54 and 73 are connected to and circuit 74 which is used to trigger the timing circuits controlled by 56 and 75. Amplifier 57 returns an amplified signal to the equalizer 47 to account for ambient noise conditions.

Instantly, upon the receipt of an acoustic signal, the signal is supplied over the line 76 to the alerter A/D converter 77 which will subsequently allow the signal processor 18 to digitize the data for further signal processing.

When an acoustic noise source that is picket up by transducer 44 is increasing in amplitude and of a sufficiently high level, Noise detector 54 and Noise Threshold Detector 73 will both produce a high level signal to An circuit 74. This will cause Time Enable 75 to trigger the 1.5 Second Timer 76. If both the noise increase and noise threshold conditions persist for a period in excess of 1.5 seconds, the 1.5 Second Timer 76 will set the Non-Transient Latch 72 thereby producing the Primary Sensor Power "On" Command at 24. This causes the Digital Signal Processor power to be turned on. The digital Signal Processor then begins requesting digitized data via the Alerter Control lines 28 to the Alerter A/D 77 and receives the digitized data via lines 30.

The timing circuit generally designated 58 also continues to monitor the acoustical signal conditions to determine whether it is decreasing. If the acoustic signal at Transducer 44 begins to decrease the output of the Noise Increase Detector 54 will drop to a low level (the output of the Noise Threshold Detector 73 will also drop to a low level if the noise drops below the minimum level set by Threshold 1). If the output of either the Noise increase Detector 54 or the Noise Threshold Detector 73, or both, drops to a low level the output of the And circuit 74 will also drop to a low level which triggers the 10 Second Timer. If this decrease of acoustic signal persists continuously for a period of time in excess of 10 seconds the 10 Second Timer will produce an Interrupt output 40 which signals the Digital Signal Processor 18 to immediately discontinue signal processing, turn the Primary Sensor Power off via 32 (if it had been turned on), and acknowledge that it is ready for power disconnect via an Alerter Control in 28 to the reset input of Non-Transient Latch 72. This causes output 24 to go to a low level thereby disconnecting power to the Digital Signal Processor 18 to conserve energy.

Figure 3:
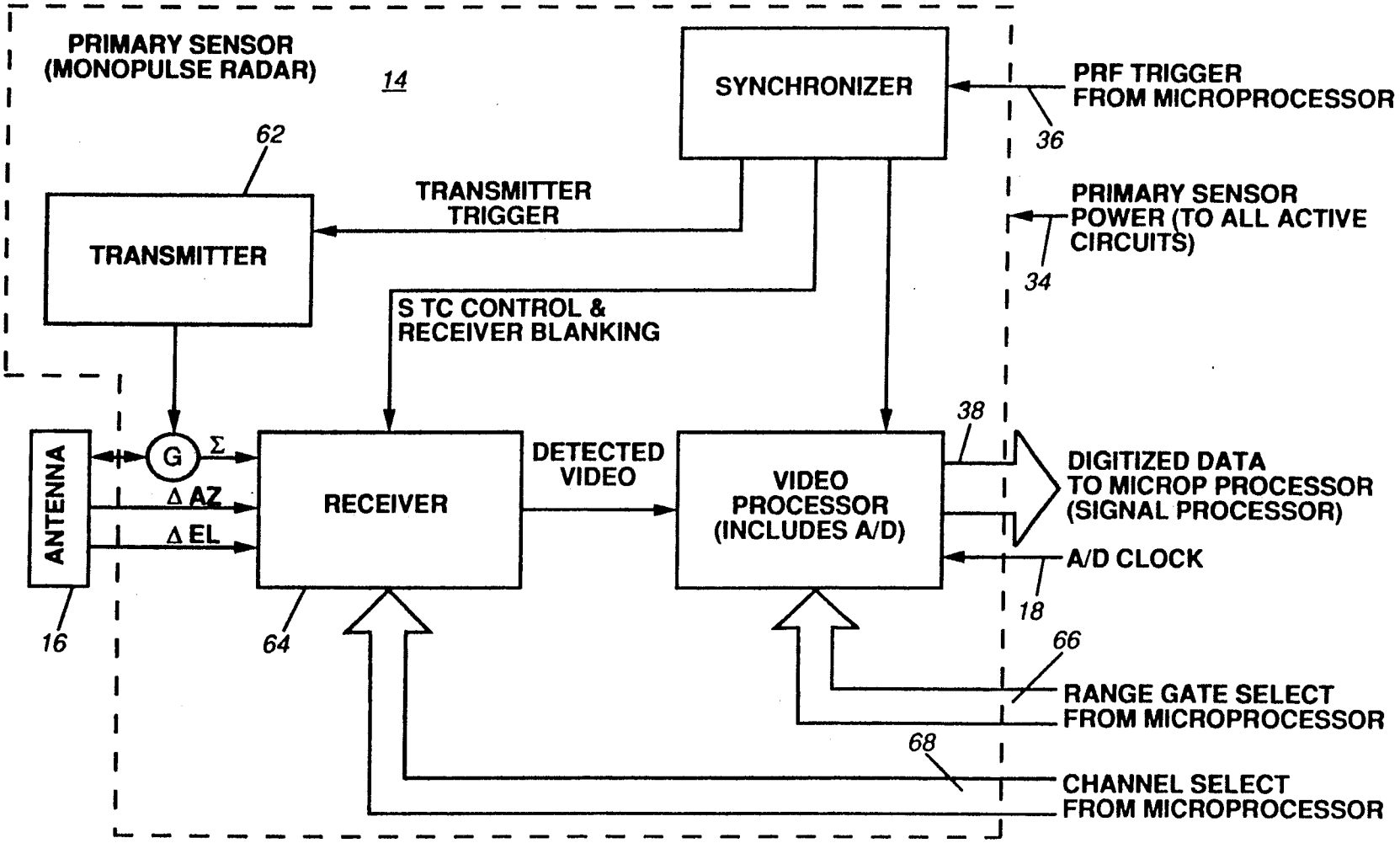
FIG. 3 is a block diagram of a primary sensor which can be used in accordance with the present invention.

FIG. 3 shows an example of the primary sensor 14 which comprises the antenna 16 that both transmits a signal of transmitter 62 and receives a reflected signal over receiver 64. Triggering of the sensor is controlled by the processor 18 over control command line 36 and data from the sensor is supplied to the processor over the data line 38. Range and channel selection functions are also provided by the digital signal processor over separate data lines 66 and 68.

Figure 4:
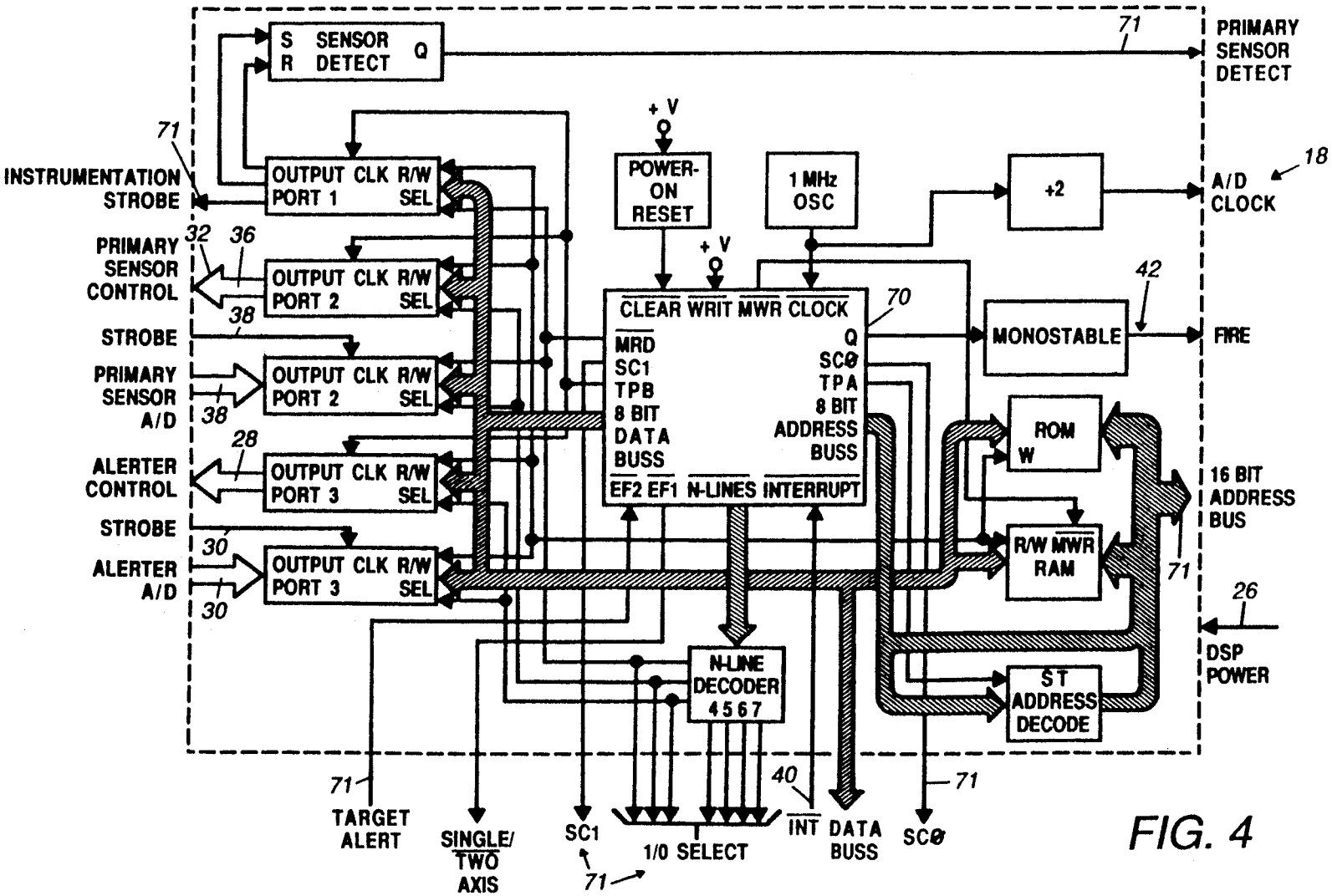
FIG. 4 is a block diagram illustrating the digital signal processor of the present invention.

FIG. 4 shows an example of the Digital Signal Processor 18. Processor 18 comprises a micro-processor 70 of conventional design which is connected by power and data bus lines to various peripheral elements that interconnect the micro-processor to the power supply, the alerter and the primary sensor.

The Digital Signal Processor 18, when it is first powered on, begins to request digitized data via the Alerter Control lines 28 to the Alerter A/D 77 and receives the digitized data via lines 30. It then performs a pattern recognition algorithm on this data to determine whether the source of the acoustic noise is the type of object for which a Primary Sensor measurement is desired. If it is not identified as the desired category of noise source the Digital Signal Processor awaits an interrupt signal 40 from the Alerter, acknowledges the interrupt, and its power is disconnected. However, if the acoustic noise is identified as being in the desired category, The Digital Signal Processor 18 activates Primary Sensor 14 and begins accessing digitized radar data using Control Commands 36 and receives the Data via Data lines 38. The Digital Signal Processor then performs a measurement algorithm on the radar data to determine when the source the object crosses directly in front of the radar antenna 16. At this point, the Digital Signal Processor 18 generates a high level signal at Output 42 which is used to trigger other circuitry which does not form a part of this disclosure.

While a specific embodiment of the invention has been shown and described in detail to illustrate the application of the principles of the invention, it will be understood that the invention may be embodied otherwise without departing from such principles.

What is claimed is:

1. A non contact system for detecting vehicles travelling toward and across a line of sight, comprising:

an acoustic alerter for detecting acoustic signals including noise from a vehicle;

a primary sensor for sensing and identifying a vehicle using electromagnetic waves to determine range and azimuth for a vehicle, said primary sensor including an antenna having the line of sight;

a digital signal processor connected to said alerter and to said primary sensor for receiving and transmitting data to and from said alerter and said sensor, said digital signal processor including means for identifying the presence of a vehicle based on acoustic signals from the alerter, said processor being connected to said primary sensor for activating said primary sensor to generate information on range and azimuth of the vehicle and on the moment at which the vehicle passes the line of sight of the antenna, the processor including means for generating an output signal when the vehicle passes the line of sight; and a power supply connected to said alerter, said primary sensor and said digital processor.

2. A system according to claim 1, including a command line connected between said alerter and said power supply for operating said power supply once said alerter detects the presence of noise which is increasing, for operating said power supply to supply power to said digital signal processor.

3. A system according to claim 2, including a command line connected between said digital signal processor and said power supply for operating said power supply to supply power to said primary sensor when said digital processor determines the presence of a vehicle based on acoustic signals from said alerter.

4. A system according to claim 3, including means in said alerter for determining when the acoustic signal detected by said alerter reduces in intensity and an interrupt line connected between said alerter and said digital signal processor for interrupting signal processing in said digital signal processor when "said alert means" detects that the acoustic signal is decreasing.

5. A system according to claim 4, wherein said primary sensor comprises monopulse radar for transmitting a radar signal to and receiving a reflected radar signal from a vehicle.

6. A method of detecting the approach of a vehicle and a passage of the vehicle passing a line of sight comprising:

detecting acoustic signals from a vehicle approaching the line of sight;

determining if the acoustic signals are increasing;

if the acoustic signals are increasing activating power to a digital signal processor from a power supply;

supplying data corresponding to the acoustic signals to the digital signal processor;

processing the acoustic signal in the digital signal processor to determine whether the acoustic signal corresponds to a signal produced by a vehicle;

if the acoustic signal corresponds to the signal produced by a vehicle, supplying power to a radar detector having an antenna with the line of sight for detecting the vehicle using radar; and if the vehicle passes the line of sight of the antenna, activating an output signal from the digital signal processor which is indicative of the vehicle passing the line of sight of the antenna.

7. A method according to claim 6, including detecting whether the acoustic signal decreases and, if the acoustic signal decreases, disconnecting power from the digital signal processor.

* * * * *